United States Patent [19]
Buzzell et al.

[11] Patent Number: 6,059,558
[45] Date of Patent: May 9, 2000

[54] INJECTION MOLDING FASTENER PRODUCTS

[75] Inventors: Keith G. Buzzell, North Waterboro, Me.; William Clune, Concord, N.H.; Andrew C. Harvey, Waltham; Kevin E. Keough, Canton, both of Mass.

[73] Assignee: Velcro Industries, Curacao, Netherlands

[21] Appl. No.: 09/122,907

[22] Filed: Jul. 27, 1998

[51] Int. Cl.[7] .................................................. B29C 45/44
[52] U.S. Cl. ........................................... 425/556; 425/577
[58] Field of Search ..................................... 425/556, 577

[56] References Cited

U.S. PATENT DOCUMENTS

| | | |
|---|---|---|
| 2,499,898 | 3/1950 | Anderson . |
| 3,031,730 | 5/1962 | Morin . |
| 3,101,517 | 8/1963 | Fox et al. . |
| 3,147,528 | 9/1964 | Erb . |
| 3,192,589 | 7/1965 | Pearson . |
| 3,266,113 | 8/1966 | Fanagan Jr. . |
| 3,507,010 | 4/1970 | Doleman et al. . |
| 3,752,619 | 8/1973 | Menzin et al. . |
| 3,758,657 | 9/1973 | Menzin et al. . |
| 3,762,000 | 10/1973 | Menzin et al. . |
| 3,899,803 | 8/1975 | Brumlik . |
| 3,987,144 | 10/1976 | Nickold . |
| 4,187,272 | 2/1980 | Bourdon et al. . |
| 4,709,757 | 12/1987 | Bly . |
| 4,725,221 | 2/1988 | Blanz . |
| 4,794,028 | 12/1988 | Fischer . |
| 4,999,067 | 3/1991 | Erb et al. . |
| 5,242,646 | 9/1993 | Torigoe et al. . |
| 5,368,549 | 11/1994 | McVicker . |
| 5,387,389 | 2/1995 | Catalanotti et al. . |
| 5,403,179 | 4/1995 | Ramsey ................................. 425/577 |
| 5,460,769 | 10/1995 | Kaneko . |
| 5,603,968 | 2/1997 | Tajiri et al. ........................... 425/556 |
| 5,630,977 | 5/1997 | Catalanotti et al. . |
| 5,656,226 | 8/1997 | McVicker . |
| 5,766,536 | 6/1998 | Felder ................................... 264/297.1 |

FOREIGN PATENT DOCUMENTS

| | | |
|---|---|---|
| 32 44 410 A1 | 10/1983 | Germany . |
| WO 94/23610 | 10/1994 | WIPO . |

*Primary Examiner*—Tim Heitbrink
*Attorney, Agent, or Firm*—Fish & Richardson P.C.

[57] ABSTRACT

Injection molding fastener element products employing a series of laterally moveable mold plates that define, in part, mold cavities for fastener elements. The laterally moveable mold plates move into open spaces provided by mold plates that retract or project in a direction normal to the base of the fastener product. This at least partially opens the fastener cavities to release the fastener elements.

28 Claims, 10 Drawing Sheets

INJECTION MOLDING FASTENER PRODUCTS

BACKGROUND OF THE INVENTION

This invention relates to injection molding of fastener products, such as for hook-and-loop fasteners, and the like.

In a typical touch fastener product, an array of hook-shaped elements extend from an integrally molded base. Hook-shaped elements are formed in small, discrete cavities in the injection mold. The ejection of touch fastener products from the mold can present difficulties due to the tendency of fastener elements to be retained by the mold cavities. This is particularly the case where the fastener elements have complex three-dimensional contours for improved performance.

SUMMARY OF THE INVENTION

The invention features an injection mold for forming a fastener product that includes laterally moveable mold parts that define, in part, fastener cavities for molding the fastener elements. The laterally moveable mold parts move to at least partially open the fastener cavities.

A general aspect of the present invention features an injection mold for molding a product having an array of fastener elements extending from a base surface of at least a small portion of the product. The mold defines a mold cavity for the product and includes a mold surface for forming the base. At least a portion of the mold has a series of face-to-face plates. At least some of the plates are mold plates defining fastener cavities for forming the fastener elements. For demolding the fastener elements, selected plates of the series are moveable in a direction normal to the base relative to respectively adjacent plates to provide open spaces that free some of the plates from lateral constraint. At least some of the plates freed from lateral constraint are laterally moveable plates constructed to move laterally into respective open spaces to at least partially open the fastener cavities.

Embodiments of this aspect include one or more of the following features:

The series of face-to-face plates includes a series of spacer plates arranged adjacent laterally moveable mold plates. Preferred embodiments of this feature include one or more of the following. The selected plates that move in a direction normal to the base are the spacer plates. The spacer plates are retractable from the mold surface to provide the open spaces. The spacer plates at least in the regions adjacent the mold cavity have a reducing taper in thickness toward the mold cavity, and corresponding regions in adjacent mold plates are tapered in the opposite sense, such that relative movement of spacer plates and mold plates in a direction normal to the base toward molding position produces a wedging action that compresses the plates together. The spacer plates are tapered in thickness toward the mold cavity across the entire length of the spacer plates. The spacer plates are composed of a softer material than the adjacent mold plates so that wear occurs preferentially in the spacer plates.

The selected plates that move in a direction normal to the base are laterally moveable mold plates. The laterally moveable mold plates are constructed to project from the mold surface to provide the open spaces. In a preferred embodiment, the laterally moveable mold plates push the base away from the mold surface.

The series of face-to-face plates includes at least one pair of mold plates. The pair of mold plates includes at least one laterally moveable mold plate. The pair of mold plates defines respective sides of fastener cavities aligned in a row for forming the fastener elements. Preferred embodiments having this feature may be characterized in one or more of the following ways. The series of face-to-face plates includes at least one pair of mold plates. The pair of mold plates includes at least one laterally moveable mold plate. The pair of mold plates defines respective sides of fastener cavities aligned in a row for forming the fastener elements. The selected plates that move in a direction normal to the base are the pair of mold plates and the pair of mold plates is constructed to project from the mold surface to push the base away from the mold surface to provide the open spaces. The series of face-to-face plates includes a series of pairs of mold plates separated by respective spacer plates. The pair of mold plates further includes a laterally stationary mold plate. The laterally stationary mold plate defines a first portion of a second row of fastener cavities and the spacer plate adjacent the laterally stationary mold plate defines a second portion of said second row of fastener cavities. The pair of mold plates further includes a second laterally moveable mold plate. The pair of mold plates further includes a retractable spacer plate. At least the side of the fastener cavities that corresponds to a laterally moveable mold plate is a three-dimensional surface. The respective sides of cavities are three-dimensional surfaces.

At least one of the moveable mold plates is a flexible cantilever that can deflect into the respective open space. Preferred embodiments having this feature may be characterized in one or more of the following ways. The cantilever mold plate is a spring having a curved shape in an unstressed condition, constructed to resiliently self-deflect into the respective open space. The cantilever mold plate is constructed to be deflected into the respective open space in response to pull forces exerted on the molded fastener elements in the respective discrete mold cavities. The cantilever mold plate is a spring metal. The cantilever mold plate is an engineering polymer.

At least one of the moveable mold plates is hinged to swing laterally into its respective open space about a hinge axis that lies parallel to the row of cavities. Preferred embodiments having this feature may be characterized in one or more of the following ways. A spring is arranged to urge the moveable mold plate to swing about the hinge axis. The moveable mold plate is free to swing about the hinge axis into the open space in response to pull forces exerted on the molded fastener elements in the respective mold cavities.

At least one of the moveable mold plates includes a tapered region. The moveable mold plate is constructed to rotate, in rocking motion, in its tapered region to deflect the moveable mold plate into the respective open space.

The injection mold further includes a clamping plate positioned at an end of the series of face-to-face plates. The clamping plate is constructed and arranged to move in a first direction towards the series of face-to-face plates to provide a clamping force that holds the series of face-to-face plates together, and to move in a second direction opposite the first direction to release the clamping force.

The injection mold further includes a wedge positioned at an end of the series of face-to-face plates. The wedge is constructed to provide a clamping force that holds the series of face-to-face plates together when a tapered surface of the wedge contacts a mold section having a matching taper. The wedge is constructed to move in a direction normal to the base surface to move the tapered surface away from the mold section to release the clamping force.

Another general aspect of the invention provides a method of releasing from a mold a product having an array of fastener elements extending from a base surface of at least a small portion of the product. The mold defines a mold cavity for the product and includes a series of face-to-face plates. At least some of the plates being mold plates defining fastener cavities for forming the fastener elements. The method includes the steps of moving selected plates in a direction normal to the base relative to respectively adjacent plates to provide open spaces that free some of the plates from lateral constraint and causing some of the plates freed from laterally constraint to move laterally into respective open spaces to partially open the fastener cavities.

Among other advantages, the injection mold allows cavities to be at least partially opened to release fastener elements after molding. Typically, ejecting a fastener element product from a mold requires significant forces to pull fastener elements from cavities due to the tendency of fastener elements to be retained in the cavities. Because fastener elements are at least partially released from the opening cavities of the injection mold, ejection forces are reduced. This can reduce damage to the molded product caused by ejector pins pushing against the base of the product, for example. Damage to, and deformation of, fastener elements can also be reduced by the opening of cavities in the injection mold prior to, or during, ejection. Fastener elements that are significantly deformed during ejection can have distorted shapes. In particular, distorted hook-shapes may not sufficiently engage loop elements, thereby reducing the performance of the fastener product.

Additionally, the injection mold forms, in some embodiments, a product having fastener elements with three-dimensional (i.e., non-flat) sides. Fastener elements with such characteristics can more readily engage loop elements, thus providing a more secure closure than flat-sided fastener elements. In certain embodiments, a fastener product with a high density of fastener elements can also be molded.

Other advantages and features of the invention will be apparent from the following description and from the claims.

DESCRIPTION OF EMBODIMENTS

Referring to FIGS. 1 to 5, an injection mold 2 has a first mold half 4 and a second mold half 6 for forming a molded product 8 having an array of fastener elements 10 extending from an integrally molded base 12. First mold half 4 is aligned with second mold half 6 to define a mold cavity into which molten plastic is injected. Base 12 is formed in a recess 14 in second mold half 6 and fastener elements 10 are formed in an array of fastener cavities 16 that extend into first mold half 4. Second mold half 4 separates from first mold half 6 when the plastic has sufficiently cooled. As described further below, injection mold 2 is constructed to release fastener elements 10 from fastener cavities 16 to facilitate the ejection of molded product 8 from the injection mold.

Figure 1:
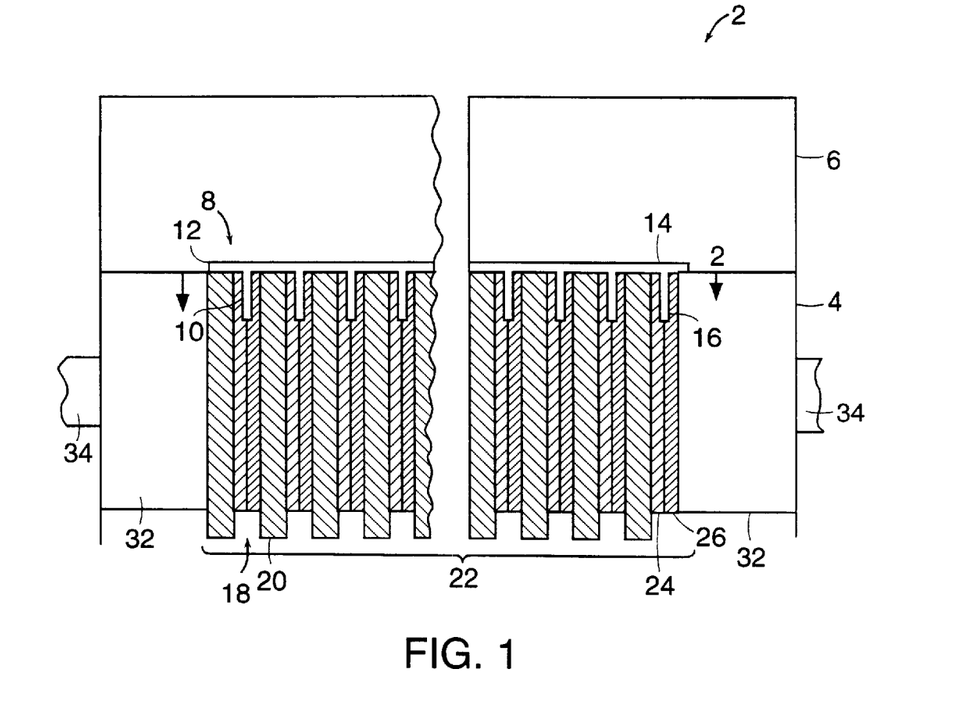
FIG. 1 illustrates an injection mold for forming a fastener product that provides a field of fastener elements.
Figure 2:
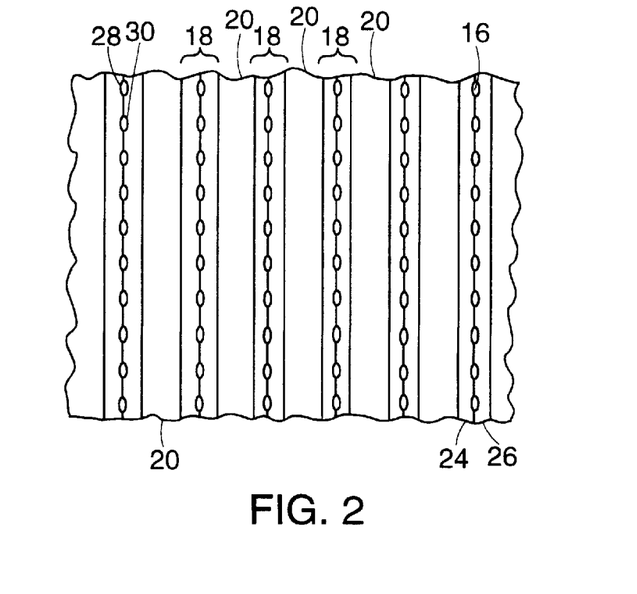
FIG. 2 is a plan view of a mold half of the injection mold of FIG. 1, taken on line 2—2.

Referring to FIGS. 1 and 2, a series of pairs 18 of adjacent mold plates are separated by spacer plates 20 and arranged in a stack 22 across first mold half 4. Pairs 18 include a moveable mold plate 24 and a laterally stationary mold plate 26. Mold indentations 28 spaced along the length of each moveable mold plate 24 are aligned with corresponding mold indentations 30 on laterally stationary mold plate 26 of pairs 18. Mold indentations 28, 30 define respective sides of fastener cavities 16 for molding fastener elements. Fastener cavities 16 may be hook-shaped, for example, and have a contoured surfaces for molding hooks with three-dimensional sides.

Clamping plates 32 positioned at one, or in this case, both sides of stack 22 are connected to hydraulic cylinders 34 which provide a force that compresses the stack during the molding process. Clamping plates 32 thus hold pairs 18 of mold plates and spacer plates 20 tightly together to prevent molten plastic from flashing between adjacent plates. Using clamping plates 32 to compress stack 22 can reduce tolerance requirements for moveable and laterally stationary mold plates 24, 26, as well as, spacer plates 20.

Figure 3:
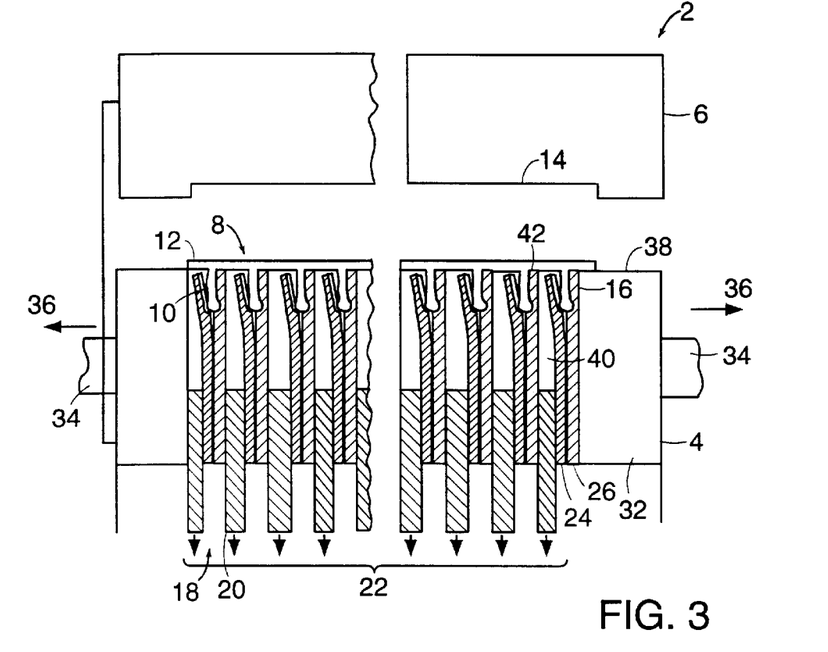
FIG. 3 illustrates the fastener elements being released from the injection mold of FIG. 1.
Figure 3A:
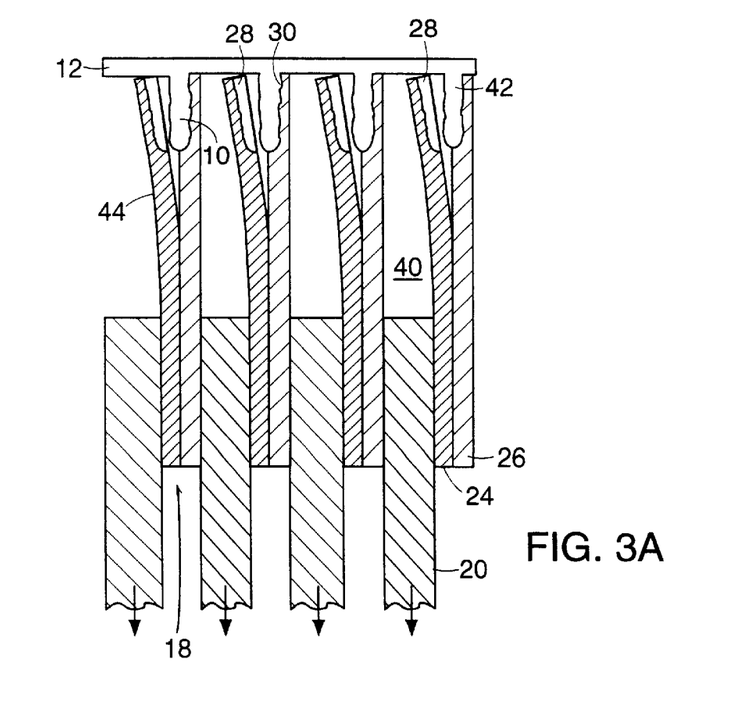
FIG. 3A is a magnified view of a section of the injection mold of FIG. 3.

Referring to FIGS. 3–3A, second mold half 6 separates from first mold half 4 to open the injection mold 2. Clamping plates 32, respectively, move slightly in the direction of arrows 36 to eliminate the clamping force on stack 22. Spacer plates 20 are retracted from a mold surface 38 of first half 4, for example, when a cam (not shown), coupled to the spacer plates, moves in coordination with the opening of the injection mold 2. The retraction of spacer plates 20 provides an open space 40 adjacent each moveable mold plate 24. Moveable mold plates 24 deflect sideways into open space 40 to partially open fastener cavities 16. Fastener elements 10 can be removed from fastener cavities 16 by slight bending of their stem portions 42 in a direction away from laterally stationary mold plate 26, to release the fastener elements from their mold indentions 30 (FIG. 2) as the product is ejected from the first mold half 4.

Figure 4:
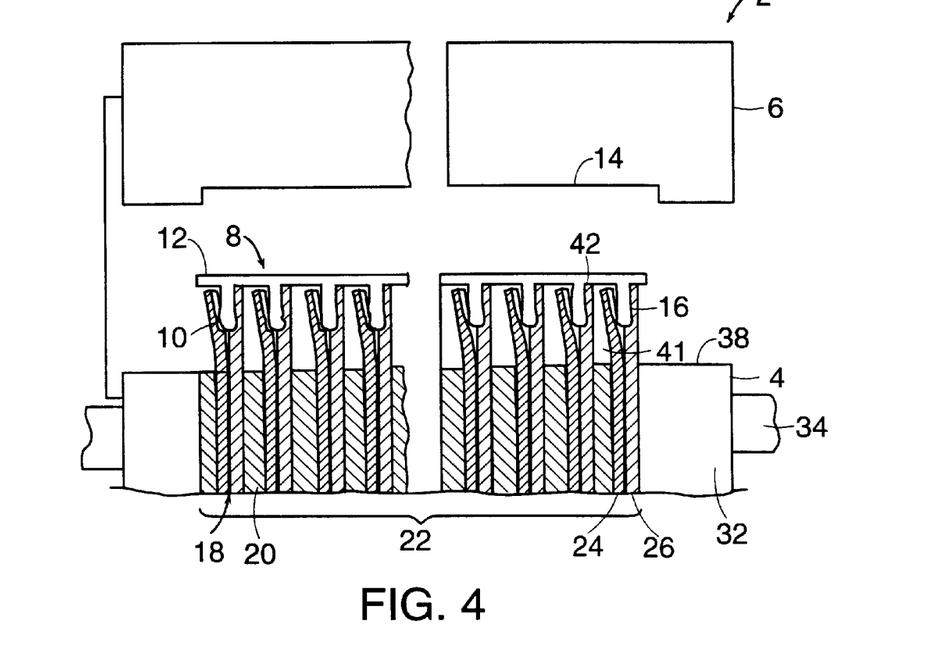
FIG. 4 illustrates an alternative arrangement for releasing the fastener elements from the injection mold of FIG. 1.

Referring to FIG. 4, an alternative embodiment of the injection mold of FIGS. 3A and 3B includes pairs 18 of mold plates that extend away from the mold surface 38 to create open spaces 41 adjacent the moveable mold plates 24, while the spacer plates 20 remain fixed. The pairs 18 push on base 12 to force molded product 8 away from first mold half 4. Moveable mold plates 24 deflect sideways, as described above, into the open spaces 41 above the spacer plates 20 to partially open the fastener cavities 16. In some cases, fastener elements 10 are released, without applying an external force, from the partially opened fastener cavities 16 thus ejecting the product from the injection mold. In other cases, fastener elements have shapes that are retained in the partially opened cavities and require an external force, provided by ejector pins for example, to disengage from the indentations 30.

Moveable mold plates 24 may be of, for example, planar form and flexible, arranged to deflect into the open space in response to pulling action exerted by the fastener elements 10 during ejection of molded product 8. Moveable mold plates 24 can be composed advantageously of spring steel and have a preformed curved shape in unstressed condition. Spacer plates 20, when aligned with mold surface 38, force such moveable mold plates 24 into a vertical alignment as shown in FIG. 1. When spacer plates 20 retract, the exposed section 44 of moveable mold plates 24 is free to restore to its curved shape. Thus, moveable mold plates 24 deflect laterally into the open space.

Moveable mold plates 24 can also be composed of an engineering polymer, filled or unfilled, and likewise have a curved shape in unstressed condition. Engineering polymers typically have low bending moduli allowing plates of engineering polymers to be flexed with relatively small amounts of force. Thus, moveable mold plates 24 made of engineering polymers are easily deflected into vertical relationship by spacer plates 20, with or without assist provided by bias forces due to curves preset in the plastic. Additionally, engineering polymers can withstand high strains, which allows moveable mold plates 24 to deflect large distances from laterally stationary mold plates 26 to substantially open fastener cavities 16. Engineering polymers suitable for use under injection mold conditions have high strengths and high temperature performance and include, for example, a mica filled PEEK (polyetheretherketone).

Figures 5, 5A, 5B:
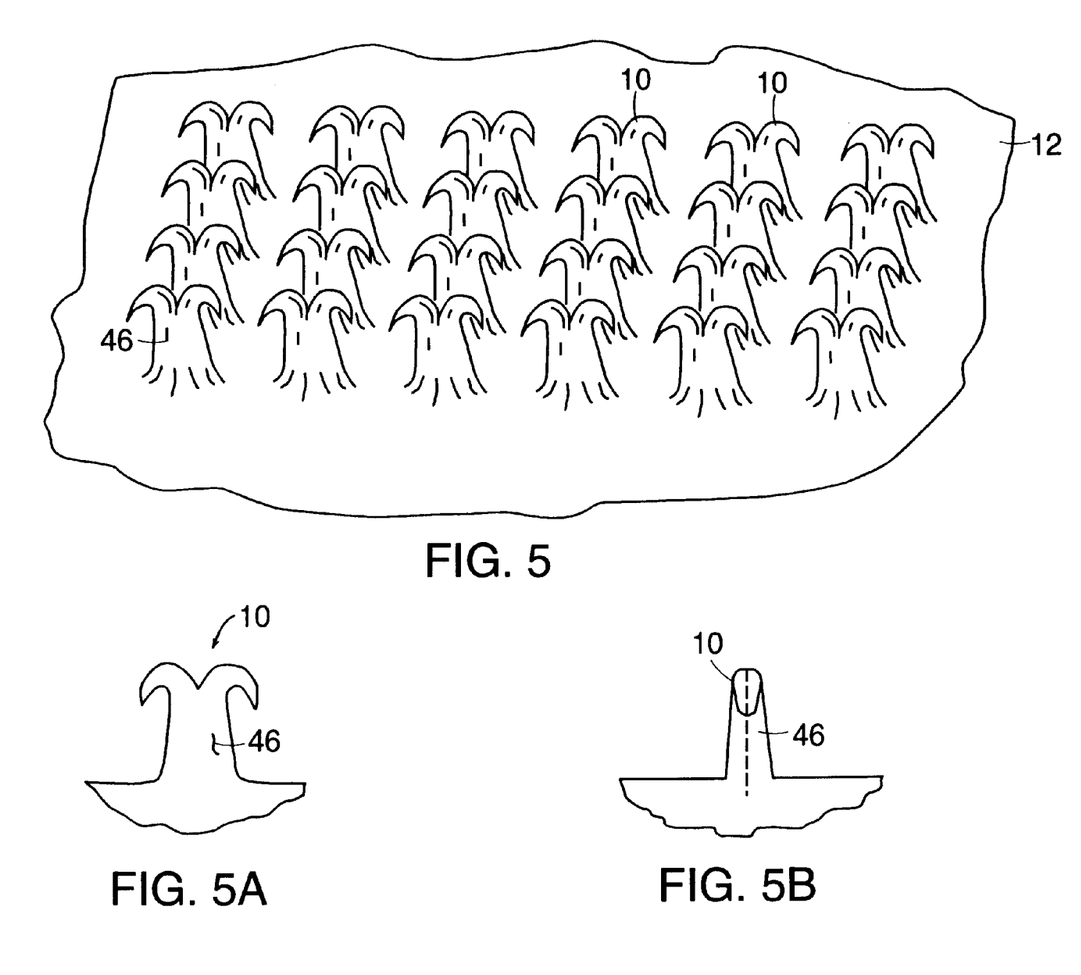
FIG. 5 is a perspective view of a portion of the fastener product formed in the injection mold of FIG. 1.
FIGS. 5A and 5B are front and side views, respectively, of a three-dimensional fastener element on the fastener product in FIG. 5.

Referring to FIGS. 5–5C, an array of fastener elements 10 are integrally molded with and extend from one side of a molded product 8, which forms a base 12 for the fastener elements. The product is molded in the injection mold of FIG. 1, and is suitable for engaging loop elements on an overlying layer (not shown) to make a closure. In this embodiment, fastener elements 10 are palm-tree shaped, having three-dimensional sides 46 which can engage more loops than a flat-sided hook, thus leading to secure closures. Generally, but not exclusively, fastener elements 10 have an overall height of less than 0.150 inches and the array has a density of greater than 50 fastener elements per square inch base, and in many cases greater than 100 fastener elements per square inch. Other types of fastener elements, for example mushroom shapes, can be molded in correspondingly shaped fastener cavities.

Figure 6:
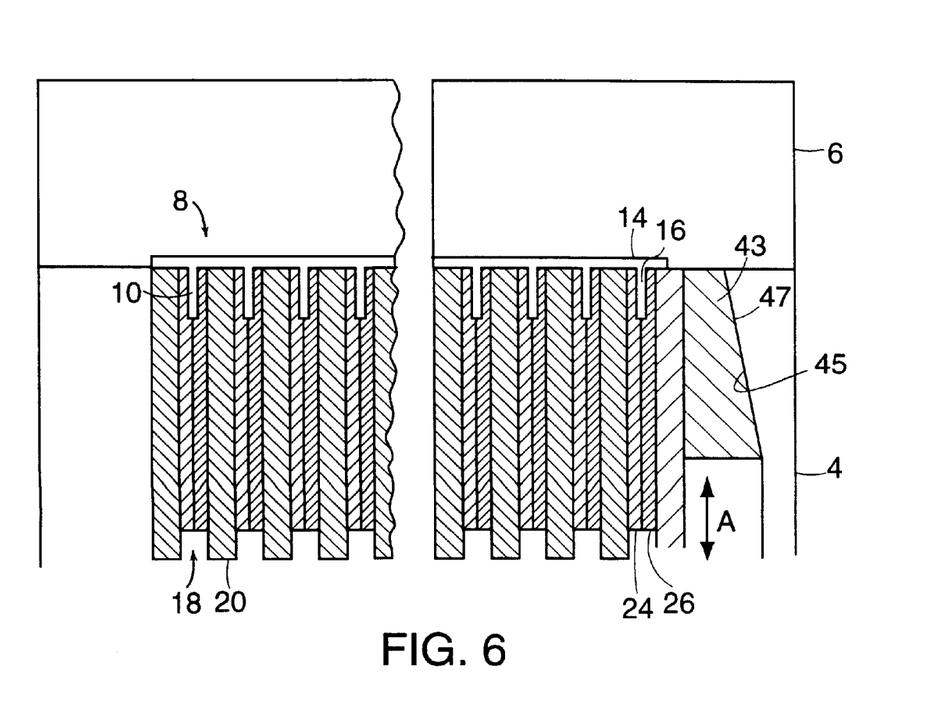
FIG. 6 shows an injection mold including a wedge that holds the plates together.

Referring to FIG. 6, an alternative arrangement for compressing the mold plates includes a wedge 43 positioned at the end of stack 22 that provides the compressive force that holds the mold plates together to prevent the flashing of molten plastic. Wedge 43 can be moved vertically along an axis A. To compress the mold plates, a tapered surface 45 of the wedge is forced flush against a mating surface 47 of first mold half 4. The wedge 43 is retracted away from the mating surface 47 to release the compressive force and allow relative motion between mold plates, as described above.

Figure 7:
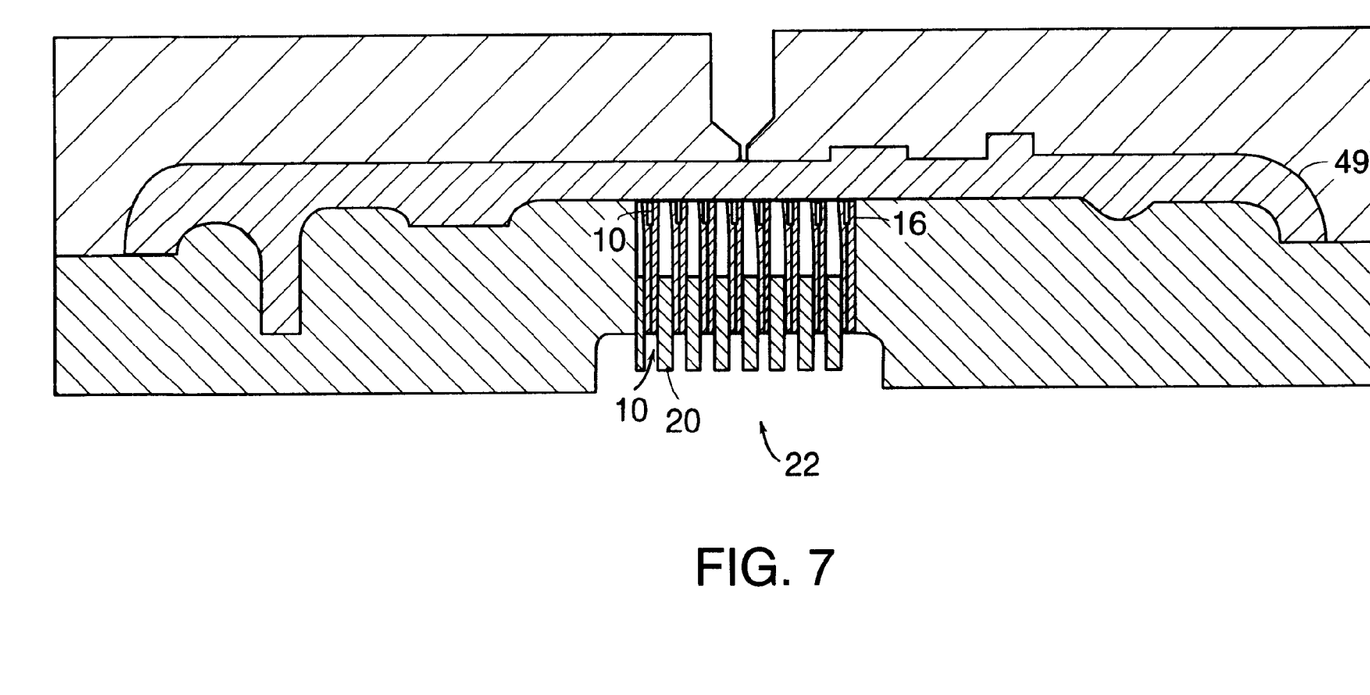
FIG. 7 is a view similar to FIG. 3A illustrating the release of a large molded part, shown diagrammatically, from a corresponding injection mold, this molded part having a field of fastener elements on a portion of its surface.

Referring to FIG. 7, the fastener element molding mechanisms disclosed herein are readily adaptable to the molding of large parts, in which the fastener elements are present as patches in relatively small, selected regions of a surface of a larger part. Thus, arrays of fastener elements may be simultaneously molded integrally with an outer surface of large, functional structures, such as automotive door panels and trim pieces, orthopedic braces, picture frames, etc., eliminating a subsequent step of attaching a fastener to such a molded structure. For illustration, the mechanism of FIGS. 1–4 is shown molding an array of fastener elements in the side of an automotive trim piece 49. It should be understood that the mechanisms shown in FIGS. 9–15 may likewise be employed.

Figure 8:
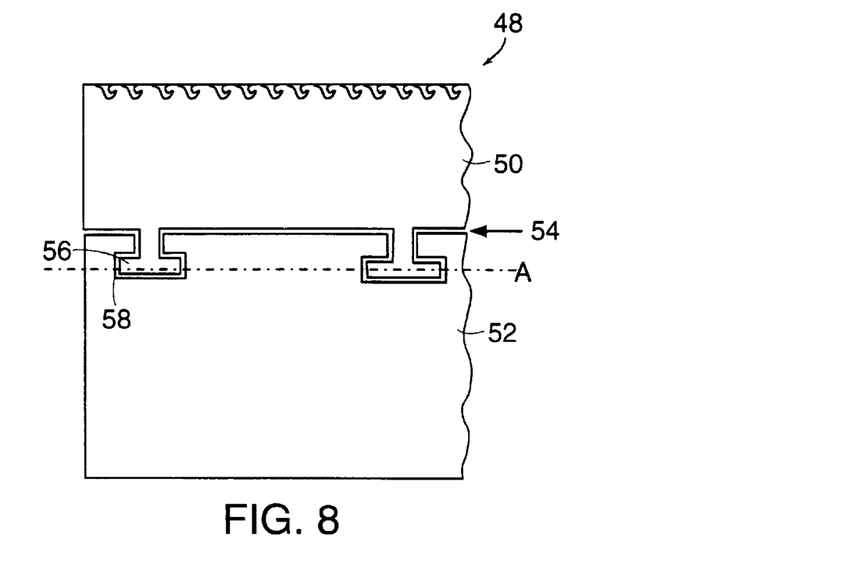
FIG. 8 is a side view of an individual hinged mold plate.
Figure 9:
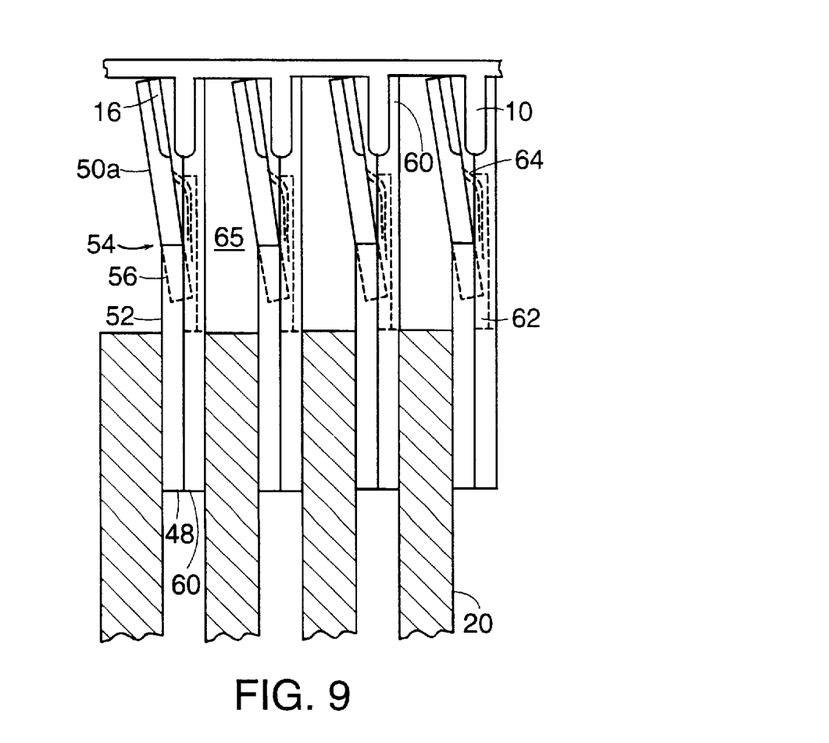
FIG. 9 is a cross-section of a portion of an injection mold having hinged mold plates.

Referring to FIGS. 8 and 9, a moveable mold plate 48 comprises a hinged member 50 which is secured to a fixed member 52 at a hinge region 54. Hinged member 50 includes tee-shaped extensions 56 that fit into corresponding slots 58 in the fixed member 52 to define hinge axis A which extends parallel to the row R of hooks formed at the edge of the moveable mold plate 48. Hinged member 50 rotates about axis A as shown in FIG. 8.

In FIG. 9, laterally stationary mold plates 60, adjacent to moveable mold plates 48a, include a hollow space 62. A spring member 64 is disposed in each hollow space 62 between the moveable mold plate 48a and laterally stationary mold plate 60. Relative motion between the spacer plates 20 and moveable mold plates 48a, by retraction of the spacer plates (FIG. 3A) or extension of the moveable mold plates (FIG. 4), creates an open space 65 adjacent the moveable mold plate. Spring member 64 deflects to push moveable member 50a into the open space 65. Fastener cavities 16 are thus opened to release fastener elements 10 from the moveable mold plate 60.

Figure 10:
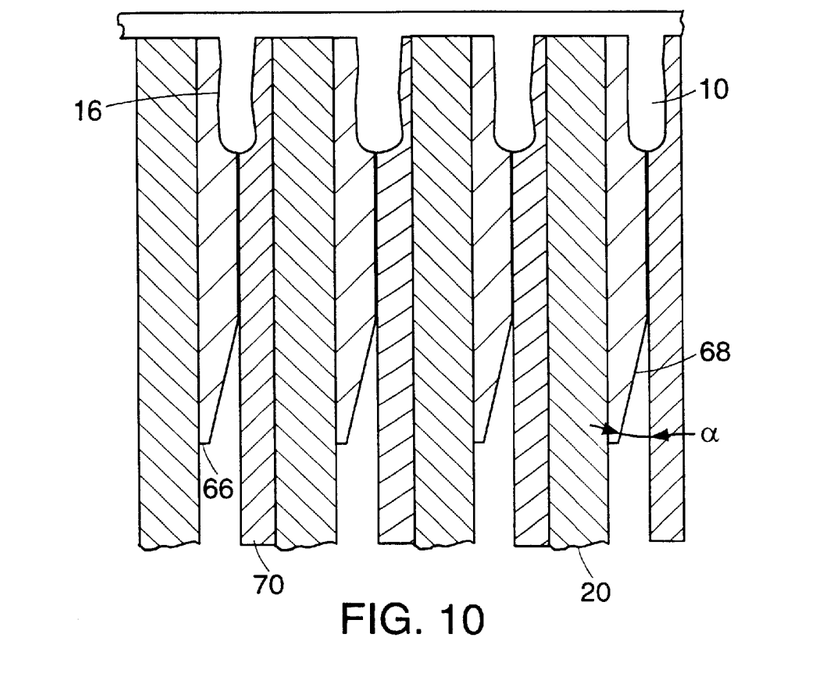
FIGS. 10 and 10A are similar cross-sections, of an injection mold with tapered mold plates, in molding and releasing positions, respectively.
Figure 10A:
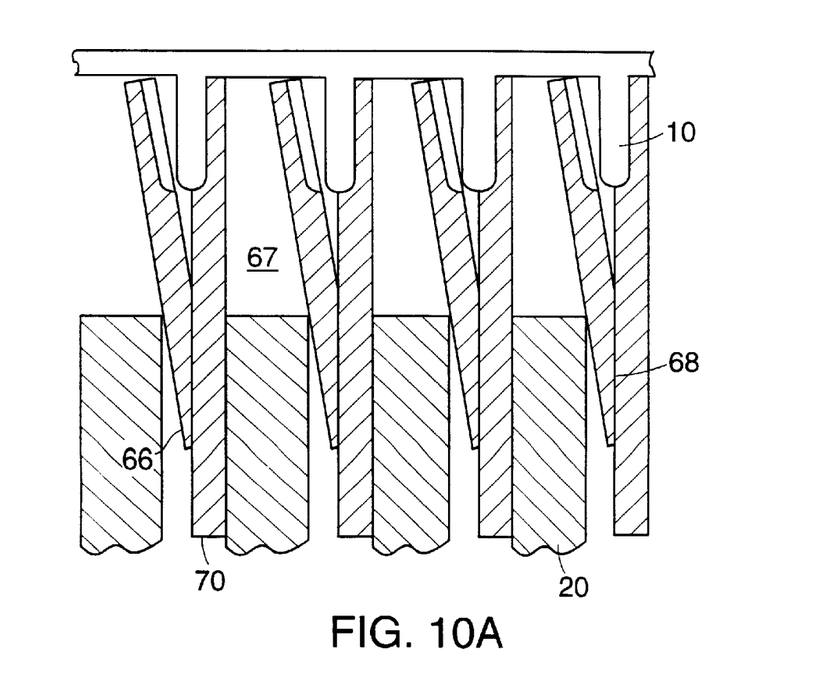

Referring to FIGS. 10 and 10A, each of a series of moveable mold plates 66 has a tapered section 68 at its end removed from fastener cavities 16. Each moveable mold plate 66 is adjacent a respective laterally stationary mold plate 70, as described above, with tapered section 68 extending away from laterally stationary mold plate 70 at an angle α. After spacer plates 20 retract or moveable mold plates 66 extend to create an empty space 67, as described above, moveable mold plates 66 move through angle α in a rocking motion to press tapered sections 68 flat against laterally stationary mold plates 70. Fastener cavities 16 are thus opened to partially release the fastener elements 10.

The moveable mold plates 66 can be rocked, for example, by the pulling force exerted by the fastener elements during the ejection of the molded product. In other cases, moveable mold plates 66 can be moved into the empty space 67 by a spring member.

Figure 11:
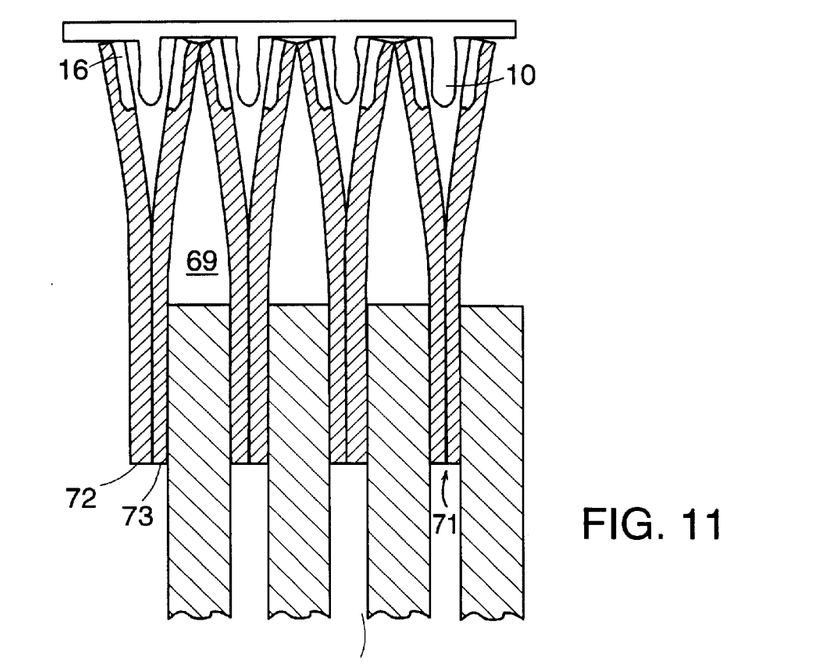
FIG. 11 is a cross-section of a portion of an injection mold having pairs of moveable mold plates that define both sides of fastener element cavities.

Referring to FIG. 11, each of a series of mold plate pairs 71 includes two adjacent moveable mold plates 72, 73 which, respectively, define sides of fastener cavities 16 for forming fastener elements 10. Moveable mold plates 72, 73 move into respective open spaces 69 to open both sides of fastener cavities 16 and release fastener elements 10. Depending upon the design of the fastener elements 10, the elements can be pulled out of fastener cavities 16 without any bending or distortion.

Moveable mold plates 72, 73, in this embodiment, can have any of the configurations described above.

Figure 12:
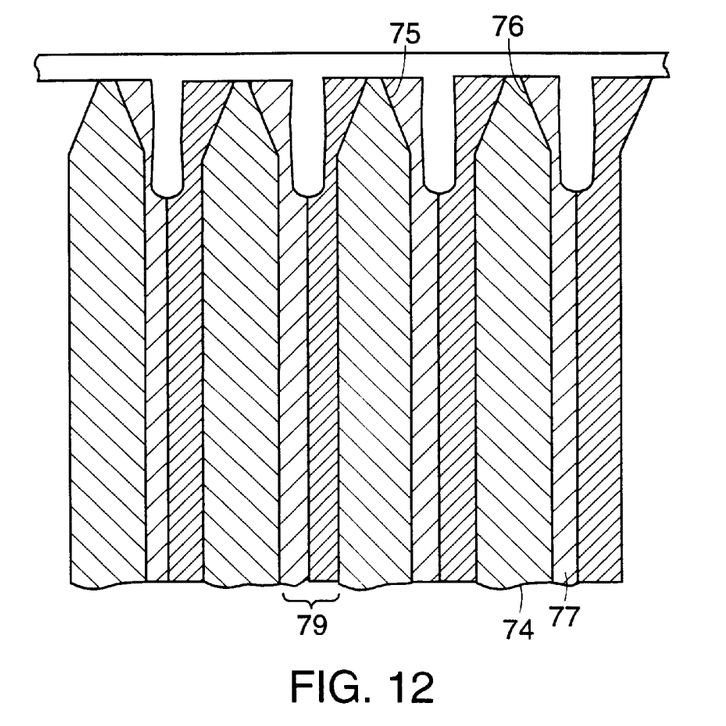
FIGS. 12 and 12A are cross-sections of a portion of an injection mold having tapered spacer plates.
Figure 12A:
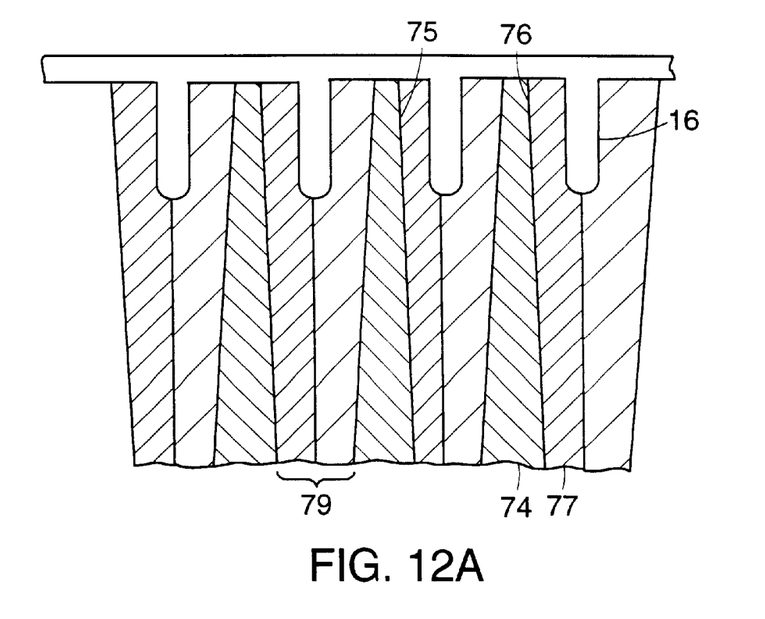

Referring to FIGS. 12 and 12A, spacer plates 74 include a tapered section 75 decreasing in thickness toward the mold cavity and adjacent moveable mold plates 77 have surfaces 76 correspondingly tapered in an opposite direction. The spacer plates 74 and moveable mold plates 77 can be tapered in a section proximal to the mold cavity (FIG. 12) or may be tapered along the entire length of the plates (FIG. 12A). A first type of relative motion between the spacer plates 74 and adjacent moveable mold plates 77, forces the plates together to prevent plastic from flashing between the plates during molding. The wedge-action between the spacer plates 74 and the moveable mold plates 77 provides sufficient compressive force to hold the plates together, thus eliminating the need for secondary sources of compressive force, for example, clamping plate 34 (FIG. 1) or wedge 43 (FIG. 6). A second type of relative motion, between the spacer plates 74 and adjacent moveable mold plates 77, opposite the first type, releases the compressive force and creates an open space into which the moveable mold plates 77 deflect sideways to open the fastener cavities 16.

Advantageously, the spacer plates 74 can be composed of a softer material, for example bronze, than the adjacent moveable mold plates 77 which are generally made of stainless or hardened steel. During the repeated cycling in use, spacer plates 74 are thus preferentially worn to prevent wearing of the mold plates.

In these embodiments, the fastener cavities 16 are defined on at least one side by respective moveable mold plates 77 with the other side being defined by a stationary mold plate, a spacer plate, or a second moveable mold plate. The moveable mold plates 77 can have any of the configurations described above. In a particularly useful case, moveable mold plates define both sides of fastener cavities 16 and are deflected sideways in response to the pulling action exerted by the fastener elements during ejection of the molded product.

Figure 13:
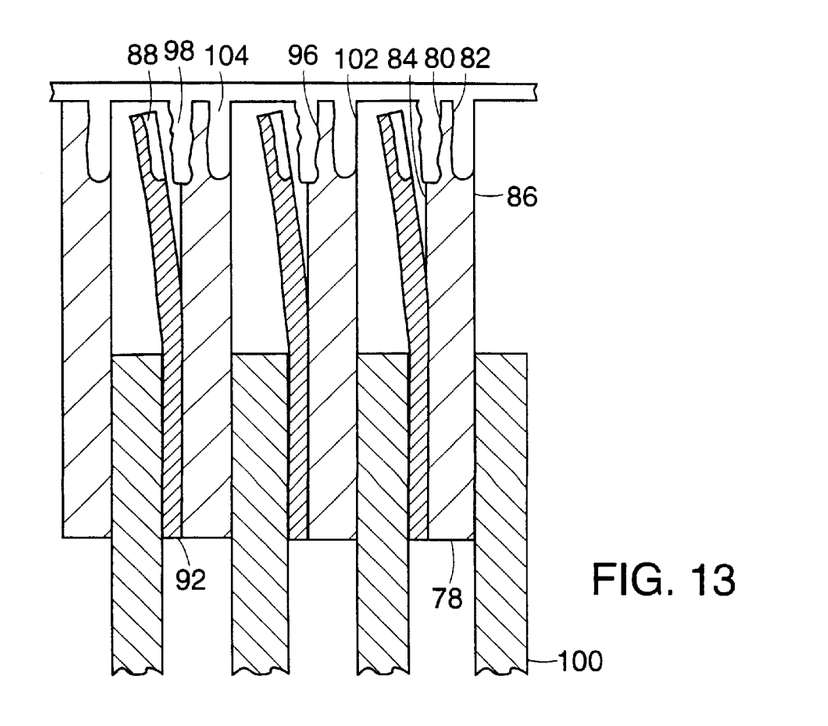
FIG. 13 is a cross-section of portion of an injection mold for forming a high density array of fastener elements.

Referring to FIG. 13, a section of an injection mold for molding a high-density array of fastener elements includes laterally stationary mold plates 78 having mold indentations 80, 82 on a first side 84 and a second side 86, respectively. Mold indentations 80 align with corresponding mold indentations 88 on adjacent moveable mold plates 92 to form a first row of fastener cavities 96 for molding fastener elements 98 with three-dimensional sides. Mold indentations 82 and spacer plates 100 define respective sides of a second row of fastener cavities 102 for molding fastener elements 104 with at least one planar side, defined by the spacer plates.

Retraction of the spacer plates 100 or extension of the moveable mold plates 92 and laterally stationary mold plates 78 partially opens a second row of fastener cavities 102 and provides an open space into which moveable mold plates 92 move to partially open a first row of fastener cavities 96. Fastener elements 98 with three-dimensional sides must be slightly bent when removed from first row of fastener cavities 96, in an action described above, while fastener elements 104 with at least one planar side are also bent when removed from second row of fastener cavities 102.

Figure 14:
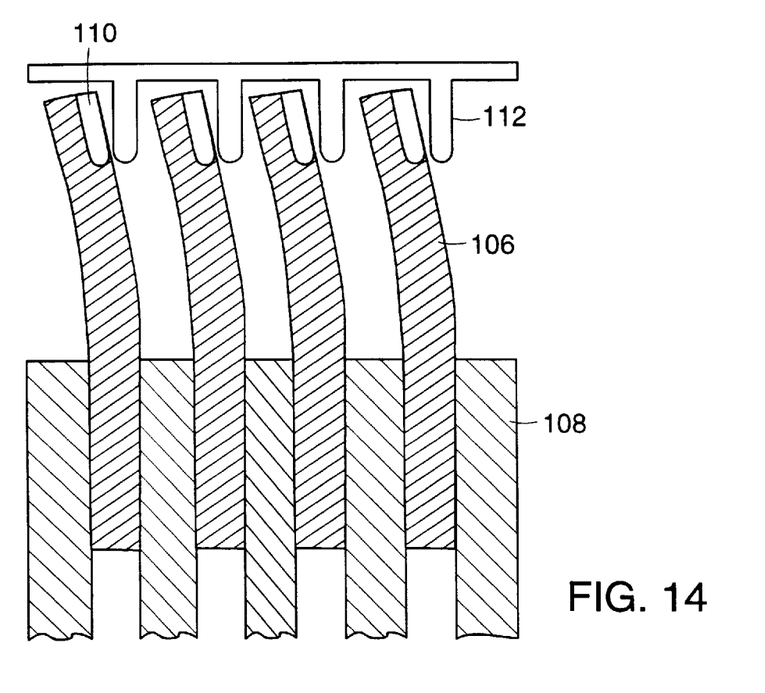
FIG. 14 is a cross-section of a portion of an injection mold having fastener element cavities defined between moveable mold plates and spacer plates.

In FIG. 14 is shown a mold assembly comprising moveable mold plates 106 alternating with spacer plates 108. The entire fastener element cavity 110 is formed in moveable mold plates 106 with the moveable mold plates defining a three-dimensional side of fastener element 112. Spacer plates define a planar side of fastener element 112. The moveable mold plates may be of any of the forms previously shown.

Figure 15:
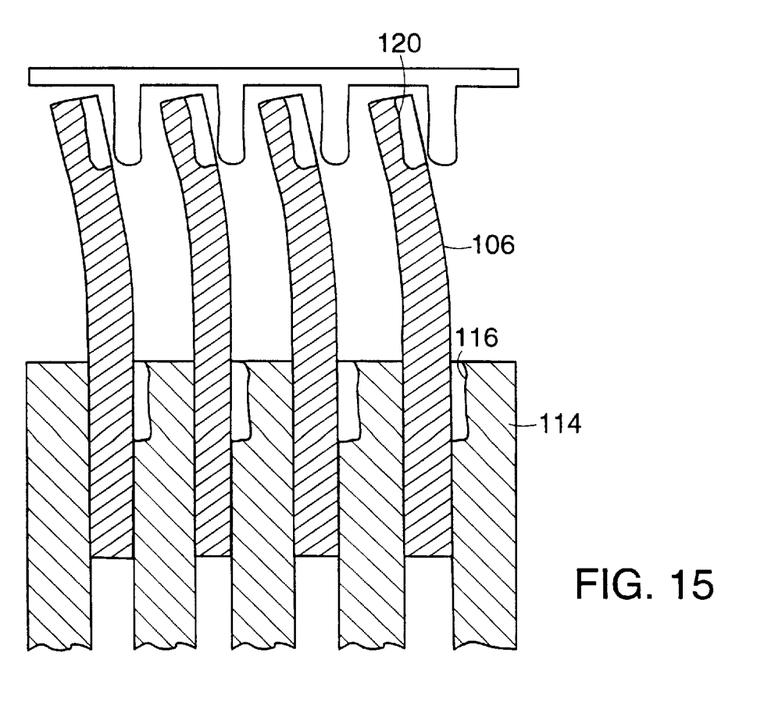
FIG. 15 is a cross-section of a portion of an injection mold having retractable spacer plates that include indentations for forming fastener elements.

Referring to FIG. 15, a mold assembly similar to that of FIG. 13, except retractable spacer plates 114 include indentations 116 that form fastener element cavities 118 with corresponding indentations 120 in moveable mold plates 106. Indentations 116 are shaped to allow retractable spacer plate to retract without being impeded by fastener elements 120. The moveable mold plates may be any of the forms previously illustrated.

Additional embodiments are also within the scope of the following claims.

What is claimed is:

1. An injection mold for molding a product having an array of fastener elements extending from a base surface of at least a small portion of the product, the mold defining a mold cavity for the product and including a mold surface for forming the base, the mold having at least a portion comprising:

a series of face-to-face plates, at least some of the plates being mold plates defining fastener cavities for forming the fastener elements, said cavities formed between abutting facing surfaces of said mold plates, for demolding the fastener elements, selected plates of said series being moveable in a direction normal to the base relative to respectively adjacent plates to provide open spaces that free some of the plates from lateral constraint, at least some of the plates freed from lateral constraint being laterally moveable plates constructed to move laterally into respective open spaces to at least partially open the fastener cavities.

2. The injection mold of claim 1 wherein said series of face-to-face plates includes a series of spacer plates arranged adjacent laterally moveable mold plates.

3. The injection mold of claim 2 wherein the selected plates that move in a direction normal to the base comprise the spacer plates, the spacer plates being retractable from the mold surface to provide the open spaces.

4. The injection mold of claim 1 wherein the selected plates that move in a direction normal to the base comprise laterally moveable mold plates, the laterally moveable mold plates constructed to project from the mold to provide the open spaces.

5. The injection mold of claim 4 wherein the laterally moveable mold plates push the base away from the mold surface.

6. The injection mold of claim 1 wherein the series of face-to-face plates includes at least one pair of mold plates, the pair of mold plates including at least one laterally moveable mold plate, the pair of mold plates defining respective sides of fastener cavities aligned in a row for forming the fastener elements.

7. The injection mold of claim 6 wherein the selected plates that move in a direction normal to the base comprise the pair of mold plates, the pair of mold plates constructed to project from the mold surface to provide the open spaces.

8. The injection mold of claim 6 wherein the series of face-to-face plates includes a series of pairs of mold plates separated by respective spacer plates.

9. The injection mold of claim 1 wherein at least one of the laterally moveable mold plates comprises a flexible cantilever that can deflect into the respective open space.

10. The injection mold of claim 9 wherein the cantilever mold plate comprises a spring having a curved shape in an unstressed condition, constructed to resiliently self-deflect into the respective open space.

11. The injection mold of claim 9 wherein the cantilever mold plate is constructed to be deflected into the respective open space in response to pull forces exerted on the molded fastener elements in the respective fastener cavities.

12. The injection mold of claim 9, 10, or 11 wherein the cantilever mold plate comprises spring metal.

13. The injection mold of claim 9, 10, or 11 wherein the cantilever mold plate comprises engineering polymer.

14. The injection mold of claim 1 wherein at least one of the moveable mold plates is hinged to swing laterally into its respective open space about a hinge axis that lies parallel to the row of cavities.

15. The injection mold of claim 14 including a spring arranged to urge the moveable mold plate to swing about the hinge axis.

16. The injection mold of claim 14 wherein the moveable mold plate is free to swing about the hinge axis into the open space in response to pull forces exerted on the molded fastener elements in the respective mold cavities.

17. The injection mold of claim 1 wherein at least one of the moveable mold plates includes a tapered region, the moveable mold plate constructed to rotate, in rocking motion, in its tapered region to deflect the moveable mold plate into the respective open space.

18. The injection mold of claim 6 wherein the pair of mold plates further includes a laterally stationary mold plate.

19. The injection mold of claim 18 wherein the laterally stationary mold plate defines a first portion of a second row of fastener cavities and the spacer plate adjacent the laterally stationary mold plate defines a second portion of said second row of fastener cavities.

20. The injection mold of claim 6 wherein the pair of mold plates further includes a second laterally moveable mold plate.

21. The injection mold of claim 6 wherein the pair of mold plates further includes a retractable spacer plate.

22. The injection mold of claim 6, 18 or 21 wherein at least the side of the fastener cavities that corresponds to a laterally moveable mold plate comprises a three-dimensional surfaces.

23. The injection mold of claim 6, 18, or 21 wherein the respective sides of cavities comprise three-dimensional surfaces.

24. The injection mold of claim 1 further comprising a clamping plate positioned at an end of the series of face-to-face plates, the clamping plate constructed and arranged to move in a first direction towards said series of face-to-face plates to provide a clamping force that holds said series of face-to-face plates together, and to move in a second direction opposite the first direction to release the clamping force.

25. The injection mold of claim 1 further comprising a wedge positioned at an end of the series of face-to-face plates, the wedge constructed to provide a clamping force that holds the series of face-to-face plates together when a tapered surface of the wedge contacts a mold section having a matching taper, and the wedge constructed to move in a direction normal to the base surface to move the tapered surface away from the mold section to release the clamping force.

26. The injection mold of claim 2 wherein the spacer plates at least in the regions adjacent to the mold cavity have a reducing taper in thickness toward the mold cavity, and corresponding regions in adjacent mold plates are tapered in the opposite sense, such that relative movement of spacer plates and mold plates in a direction normal to the base toward molding position produces a wedging action that compresses the plates together.

27. The injection mold of claim 26 wherein the spacer plates have a reducing taper in thickness toward the mold cavity across the entire length of the spacer plates.

28. The injection mold of claim 26 wherein the spacer plates are composed of a softer material than the adjacent mold plates so that wear occurs preferentially in the spacer plates.

* * * * *